(12) United States Patent
Yanagisawa et al.

(10) Patent No.: US 7,313,297 B2
(45) Date of Patent: Dec. 25, 2007

(54) WAVELENGTH MULTI/DEMULTIPLEXER

(75) Inventors: Masahiro Yanagisawa, Mito (JP);
Taisuke Oguchi, Mito (JP); Yasuyuki Inoue, Isehara (JP); Yoshinori Hibino, Atsugi (JP); Yasuhiro Hida, Atsugi (JP); Motohaya Ishii, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 149 days.

(21) Appl. No.: 10/534,434

(22) PCT Filed: Sep. 10, 2004

(86) PCT No.: PCT/JP2004/013228

§ 371 (c)(1),
(2), (4) Date: May 10, 2005

(87) PCT Pub. No.: WO2005/026796
PCT Pub. Date: Mar. 24, 2005

(65) Prior Publication Data
US 2006/0023989 A1 Feb. 2, 2006

(30) Foreign Application Priority Data
Sep. 12, 2003 (JP) ............... 2003-321046
Feb. 20, 2004 (JP) ............... 2004-044352

(51) Int. Cl.
*G02B 6/26* (2006.01)
(52) U.S. Cl. ........................... 385/24; 385/14
(58) Field of Classification Search ............ None
See application file for complete search history.

(56) References Cited

U.S. PATENT DOCUMENTS
5,764,825 A * 6/1998 Mugino et al. ............... 385/24
6,085,000 A * 7/2000 Tanaka et al. ................ 385/45

FOREIGN PATENT DOCUMENTS
JP 62-183405 8/1987

(Continued)

OTHER PUBLICATIONS

Machine translation of detailed description for JP 9-73019A, Mar. 1997, retrieved via http://www4.ipdl.inpit.go.jp/Tokujitu/tjsogodben.ipdl?N0000=115 on Jun. 19, 2007.*

(Continued)

*Primary Examiner*—Kevin Wood
*Assistant Examiner*—Mike Stahl
(74) *Attorney, Agent, or Firm*—Workman Nydegger

(57) ABSTRACT

Disclosed is a wavelength multi/demultiplexer for separating two wavelength bands with a narrow wavelength spacing. A dielectric multilayer filter is provided in an intersection portion where two optical waveguides intersect each other and separates incident light to the dielectric multilayer filter to transmitted light and reflected light. Here, the distance X from the multilayer surface on the light-incident side of the dielectric multilayer to the central intersection point of the two intersecting optical waveguides is arranged to satisfy $0 \leq X \leq d/2$ (where "d" represents the thickness of the dielectric multilayer). With this configuration, a multi/demultiplexer can be realized that shows good wavelength response without spectral degradation even for two wavelengths having narrow wavelength spacing.

9 Claims, 15 Drawing Sheets

FOREIGN PATENT DOCUMENTS

| | | |
|---|---|---|
| JP | 01-118806 | 5/1989 |
| JP | 04-056818 | 2/1992 |
| JP | 4-346527 | 12/1992 |
| JP | 8-190026 | 7/1996 |
| JP | 08-254629 | 10/1996 |
| JP | 09-073019 | 3/1997 |
| JP | 9-159850 | 6/1997 |
| JP | 10-282350 | 10/1998 |
| JP | 2002-368695 | 12/2002 |

OTHER PUBLICATIONS

NTT Technical Journal, vol. 15, No. 1, Jan. 2003, pp. 24-27 (with partial translation).

* cited by examiner

| INTERSECTION ANGLE / WAVEGUIDE WIDTH / DISTANCE X | 8 DEGREES | | 10 DEGREES | | 12 DEGREES | |
|---|---|---|---|---|---|---|
| | 8 μm | 20 μm | 8 μm | 20 μm | 8 μm | 20 μm |
| 0 μm | △ | △ | △ | △ | △ | △ |
| 3 | ○ | ○ | ○ | ○ | ○ | ○ |
| 6 | ○ | ○ | ○ | ○ | ○ | ○ |
| 9 | ○ | ○ | ○ | ○ | ○ | ○ |
| 12 | ○ | ○ | ○ | ○ | ○ | ○ |
| 15 | △ | △ | △ | △ | △ | △ |
| 18 | × | × | × | × | × | × |
| 21 | × | × | × | × | × | × |
| 24 | × | × | × | × | × | × |
| 27 | × | × | × | × | × | × |
| 30 | × | × | × | × | × | × |

○ : SUITABLE
× : UNSUITABLE

FIG.8

| INTERSECTION ANGLE / WAVEGUIDE WIDTH / DISTANCE X | 8 DEGREES | | 10 DEGREES | | 12 DEGREES | |
|---|---|---|---|---|---|---|
| | 7 μm | 20 μm | 7 μm | 20 μm | 7 μm | 20 μm |
| 0 μm | △ | △ | △ | △ | △ | △ |
| 4 | ○ | ○ | ○ | ○ | ○ | ○ |
| 8 | ○ | ○ | ○ | ○ | ○ | ○ |
| 12 | ○ | ○ | ○ | ○ | ○ | ○ |
| 16 | ○ | ○ | ○ | ○ | ○ | ○ |
| 20 | △ | △ | △ | △ | △ | △ |
| 24 | × | × | × | × | × | × |
| 28 | × | × | × | × | × | × |
| 32 | × | × | × | × | × | × |
| 36 | × | × | × | × | × | × |
| 40 | × | × | × | × | × | × |

○ : SUITABLE
× : UNSUITABLE

FIG.9

WAVELENGTH MULTI/DEMULTIPLEXER

TECHNICAL FIELD

The present invention relates to a wavelength multi/demultiplexer used in an optical communication, and particularly to an optical wavelength multi/demultiplexer capable of separating two wavelength bands having a narrow wavelength spacing, with a simple configuration.

BACKGROUND ART

An optical wavelength division multiplexing (WDM) system for transmitting light of multiple wavelengths through a single transmission line has been used to realize high-capacity transmission and/or simultaneous bidirectional transmission. In a WDM system, there are a variety of multi/demultiplexers for combining and/or separating multiplexed light, and a low-cost device is required for such multi/demultiplexers used in subscriber (access) systems.

FIG. 14 shows a conventional wavelength multi/demultiplexer 500.

The conventional wavelength multi/demultiplexer 500 is a low-cost device, which combines and/or separates two wavelengths of 1.3 µm and 1.55 µm (see Patent Document 1, for example). The "wavelength multi/demultiplexer" for use in optical communications is a device that combines signals with different wavelengths together and/or separates them apart.

The conventional wavelength multi/demultiplexer 500 has single-mode optical waveguides 2, 3 and 2', a groove 4 provided at a position where the optical waveguides 2 and 3 intersect each other, and a dielectric multilayer filter 5 inserted into the groove 4. The filter 5 has a reflection band at the 1.55 µm band and a pass band at the 1.31 µm band.

The dielectric multilayer filter 5 is arranged to be perpendicular to the bisector of the intersection angle between the optical waveguides 2 and 3, and in a manner that its reflective surface is positioned at the intersection point of the optical waveguides 2 and 3.

As such, a geometric reflective structure is provided by the optical waveguides 2, 3 and the dielectric multilayer filter 5, and the optical waveguide 2' is arranged for the light passed through the dielectric multilayer filter 5. In this way, for the multiplexed light of 1.31 µm and 1.55 µm wavelengths that travel through the optical waveguide 2 via an optical fiber (not shown), the 1.55 µm light is reflected at the dielectric multilayer filter 5 and output to the optical waveguide 3. At the same time, the 1.31 µm light is passed through the dielectric multilayer filter 5 and output to the optical waveguide 2'.

In this configuration, since the optical waveguide 3, into which the 1.55 µm light reflected at the dielectric multilayer filter 5 is coupled, is a single-mode optical waveguide, how the coupling loss is to be reduced is an important issue. To solve this issue, a setting position of the dielectric multilayer filter 5, an intersection angle between the optical waveguides 2 and 3, and a maker position for high-precision groove processing have been optimized, and a multi/demultiplexer with a required loss has been realized (see Patent Document 1, for example).

For reference's sake, in the conventional wavelength multi/demultiplexer 500, the optical waveguide 2' is branched into a Y-shape, and for each of the branched optical waveguides, a laser diode or a photodiode is provided fabricating a transmitter/receiver module.

It should be note that the Y-shape branched optical waveguides, laser diode, and photodiode are omitted in FIG. 14.

Recently, there have been advances in the diversification of services in the access systems, and the wavelength spacing to be separated is becoming narrower. For example, in the PON (Passive Optical Network) system for single-fiber bidirectional communications, the 1480-1580 nm band used for downstream signals are divided into two bands of 1480-1500 nm and 1550-1560 nm. It has then been proposed to assign the latter band to another future service, such as vide delivery (see Non-Patent Document 1, for example).

According to this prior art embodiment, a demultiplexer for separating the 1480-1500 nm band and the 1550-1560 nm band is required to have a performance that separates the narrowest spacing of two wavelengths of 1500 nm and 1550 nm.

Also, as another prior art embodiment, in an optical line testing system using a different wavelength from the communication wavelength, the test light wavelength of 1650 nm is used relative to the upper limit wavelength of 1625 nm in the communication wavelength band (see Patent Document 2, for example). In this case, it is required to separate the signal light and the test light which are adjacent with 25 nm.

If a wavelength multi/demultiplexer for the two wavelengths disposed at such a narrow wavelength spacing can be realized with a configuration using a conventional intersectional optical waveguide, it is advantageous for cost reduction.

When constructing a wavelength multi/demultiplexer based on the above configuration, due to the incident light to the dielectric multilayer filter 5 being divergent light, the wavelength response, that is slope of the transmission spectrum in the wavelength region from a pass band to a reflection band in the resulting multi/demultiplexing characteristics is degraded. Therefore for narrow separation wavelength spacing, the wavelength response degradation in the pass band can not be ignored. Also, it is required to increase the thickness of the dielectric multilayer to narrow the separation spacing, which leads to affect spectral degradation due to the divergent light furthermore.

FIG. 15 shows a characteristic of the wavelength multiplexer/demultiplexer 500 in the above prior art embodiment.

The inventors have studied with their prototypes by setting the refractive index difference of optical waveguides at a practical lower limit of about 0.3% and found a spectral degradation, as shown in FIG. 15, in the reflection path from the optical waveguide 2 to the optical waveguide 3, which hindered the realization of a wavelength multi/demultiplexer.

This spectral degradation has a peak P of a minimum loss around the edge wavelength of the reflection band and shows an increase in loss on its longer-wavelength side, which cannot be explained from the characteristics of the dielectric multilayer filter 5.

In addition, in the multi/demultiplexing spectrum, a problem exists in that the wavelength response around the edge wavelength from the pass band to the reflection band may not be good enough.

Accordingly, it is an object of the present invention to provide a wavelength multi/demultiplexer with intersectional optical waveguides having no spectral degradation and good wavelength response even for two narrowly spaced wavelengths.

Patent Document 1: Japanese Patent Application Laid-open No. 8-190026 (1996)

Patent Document 2: Japanese Patent Application Laid-open No. 2002-368695

Non-Patent Document 1: NTT Technical Journal, Vol. 15, No. 1, January 2003, pp. 24-27

DISCLOSURE OF THE INVENTION

The present invention is directed to a wavelength multi/demultiplexer for separating two wavelength bands, disposed at less than a certain spacing. A dielectric multilayer filter is provided in an intersection portion where two optical waveguides intersect each other and incident light to the dielectric multilayer filter is separated into transmitted light and reflected light. Here, the distance X from the dielectric multilayer filter surface on the light-incident side of the multilayer filter to the central intersection point of the two intersecting optical waveguides is designed to satisfy $0 \leq X \leq d/2$ (where "d" represents the thickness of the dielectric multilayer).

More specifically, in the present invention, spectral characteristic in the reflection path becomes nearly rectangular shape in the range of the distance X being from 0 to d/2, and reflection loss does not excessively increase on the longer-wavelength side of the edge wavelength of the reflection band. That is, there exists no minimum loss of the peak P, which is outstanding in the prior art embodiment shown in FIG. 15.

Furthermore, in the present invention, the spectral characteristic in the reflection path become more close to rectangular shape in the range of the distance X satisfying $d/10 \leq X \leq 2d/5$, and the separation is improved against wavelengths disposed with narrow wavelength spacing. Moreover, no increase in reflection loss occurs on the longer-wavelength side of the edge wavelength.

The wavelength multi/demultiplexer with intersectional optical waveguides according to the present invention advantageously provides no spectral degradation and good wavelength response even for two narrowly spaced wavelengths.

BRIEF DESCRIPTION OF THE DRAWINGS

FIG. 8 is a summary of suitable range for setting distance X when width $W_2$ of the optical waveguides at the intersection portion is 8 μm and 20 μm, and the intersection angle 2θ is 8, 10 and 12 degrees, in the first embodiment of the present invention;

FIG. 9 is a summary where the refractive index difference of the optical waveguides is set at 0.45% and the dielectric multilayer filter 5 is replaced with a dielectric multilayer film of $SiO_2$ and $Ta_2O_5$ (with a thickness of about 40 μm), whose edge wavelength of pass band is set at around 1620 mm, in the first embodiment of the present invention;

BEST MODE FOR CARRYING OUT THE INVENTION

The best mode for carrying out the invention is as in the following embodiments.

First Embodiment

Figure 1A:
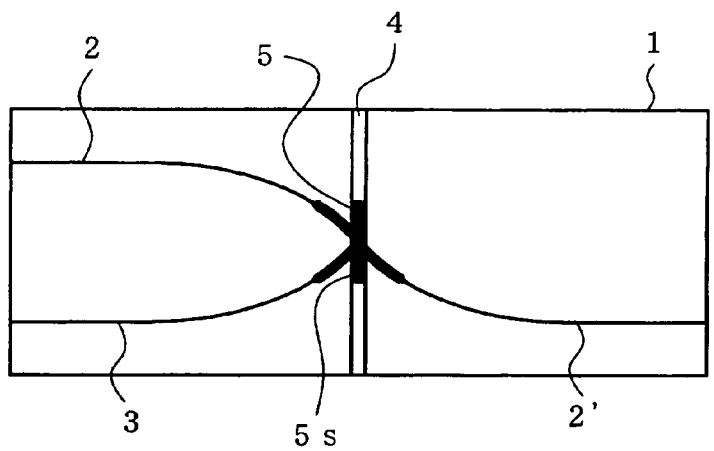
FIG. 1A is a plane view showing a wavelength multi/demultiplexer 100 according to a first embodiment of the present invention.
Figure 1C:
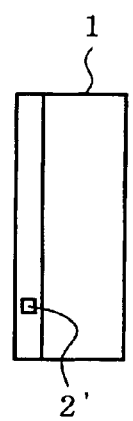
FIG. 1C is a right side view showing the, wavelength multi/demultiplexer 100 according to the first embodiment of the present invention.
Figure 1B:
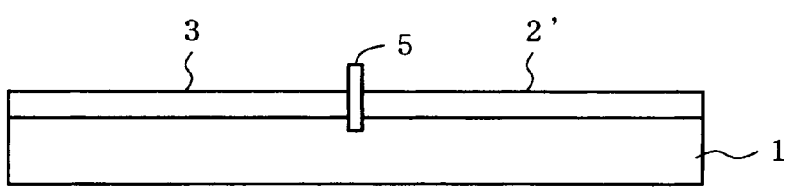
FIG. 1B is a front view showing the wavelength multi/demultiplexer 100 according to the first embodiment of the present invention.

FIG. 1A is a plane view showing a wavelength multi/demultiplexer 100 according to the first embodiment of the present invention, and FIGS. 1B and 1C are, respectively, a front view and a right side view thereof.

Figure 2A:
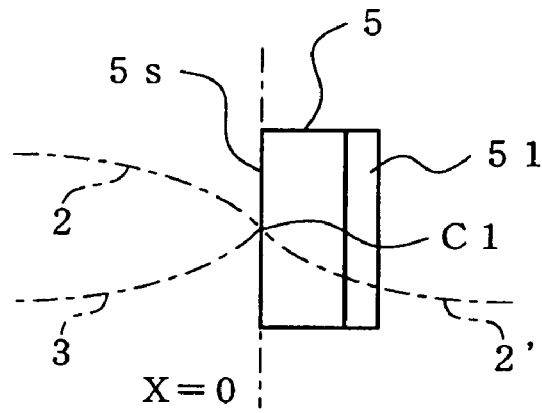
FIG. 2A is an illustration of the positional relationship, in the wavelength multi/demultiplexer 100, where the distance X from a multilayer surface 5s of a dielectric multilayer filter 5 to an intersection point C1 of optical waveguides 2 and 3 is 0.
Figure 2B:
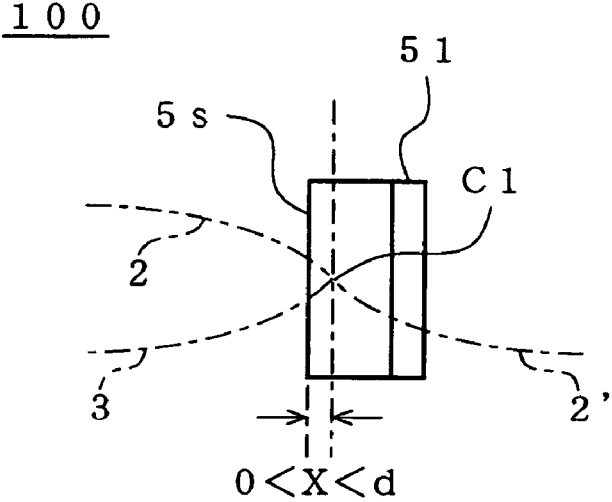
FIG. 2B is an illustration of the positional relationship, in the wavelength multi/demultiplexer 100, where the distance X from the multilayer surface 5s of the dielectric multilayer filter 5 to the intersection point C1 of the optical waveguides 2 and 3 is ranging from 0 to d.
Figure 2C:
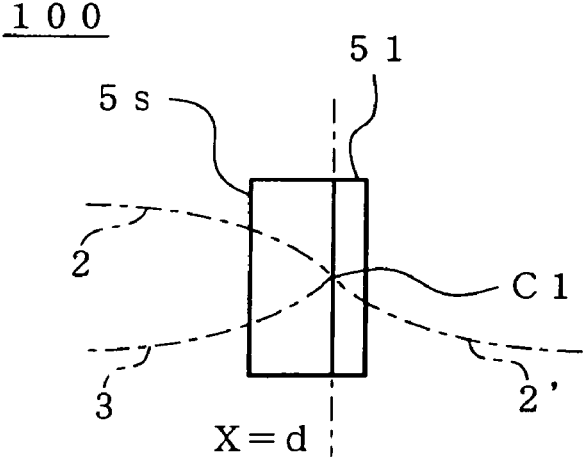
FIG. 2C is an illustration of the positional relationship, in the wavelength multi/demultiplexer 100, where the distance X from the multilayer surface 5s of the dielectric multilayer filter 5 to the intersection point C1 of the optical waveguides 2 and 3 is d.

FIG. 2A is an illustration of a positional relationship, in the wavelength multi/demultiplexer 100, where the distance X from a multilayer surface 5s of a dielectric multilayer filter 5 to an intersection point C1 of optical waveguides 2 and 3 is 0. Furthermore, FIGS. 2B and 2C are illustrations of positional relationships, showing respectively where the distance X is ranging from 0 to d and the distance X is d, respectively.

The wavelength multi/demultiplexer 100 comprises a silicon substrate 1, single-mode optical waveguides 2, 3 and 2', a groove 4, and a dielectric multilayer filter 5.

The single-mode optical waveguides 2, 3 and 2' comprise a core and a clad made of silica-based glass. The dielectric multilayer filter 5 is placed within the groove 4.

The optical waveguides 2 and 3 form an intersectional optical waveguide comprising an intersection point C1 at the central portion of the substrate 1, and the reflected light at the dielectric multilayer filter 5 is guided into the optical waveguide 3. Also, the optical axis of the optical waveguide 2' is aligned with that of the optical waveguide 2 to guide the transmitted light through the dielectric multilayer filter 5 into the optical waveguide 2'. The groove 4 is provided where the optical waveguides 2 and 3 intersect each other, into which the dielectric multilayer filter 5 is inserted and fixed with adhesive (not shown).

The dielectric multilayer filter 5 passes shorter wavelengths and has a pass band at the wavelength of 1260-1500 nm and a reflection band at the wavelength of 1550-1600 nm, wherein an alternating multilayer of $SiO_2$ and $Ta_2O_5$ with a thickness of about 30 μm is formed on a polyimide thin-film substrate (substrate 51) with a thickness of about 5 μm.

Accordingly, for light with wavelength bands of 1260-1500 nm and 1550-1600 nm input to the optical waveguide 2, the former 1260-1500 nm band light may be passed and coupled into the optical waveguide 2', and the latter 1550-1600 nm band light may be reflected and coupled into the optical waveguide 3.

The dielectric multilayer filter 5 is arranged such that the multilayer surface 5s faces to the light-incident side, and that the distance X from the multilayer surface 5s to the intersection point C1 of the optical waveguides is 6 μm.

As above, the thickness of the dielectric multilayer film 5 is 30 μm and that of the substrate 51 is 5 μm, so the dielectric multilayer film 5 and the substrate 51 are inserted into the groove 4. Therefore, the half of total thickness of 30 μm+5 μm=35 μm (17.5 μm) is the distance from the multilayer surface 5s to the center of the dielectric multilayer filter including the substrate 51. Also, since the distance X from the multilayer film surface 5s to the intersection point C1 of the optical waveguides is 6 μm, the distance from the intersection point C1 of the optical waveguides to the center of the dielectric multilayer filter including the substrate 51 is 17.5 μm−6 μm=11.5 μm.

That is, the center of the dielectric multilayer filter including the substrate 51 is positioned at a distance of 11.5 μm apart from the intersection point C1 of the optical waveguides, and the groove 4 is arranged to be perpendicular to the perpendicular bisector of the optical waveguides 2 and 3 and with a wider width than the total thickness of the dielectric multilayer film 5 by 2 μm to 3 82 m.

In the first embodiment, the groove 4 is formed by a dicing saw and a metal marker is provided as a positioning reference when forming the groove 4 on the optical waveguide chip (silicon substrate 1), thereby enabling to maintain the distance X from the multilayer surface 5s to the intersection point C1 of the optical waveguides within 6 μm±3 μm.

FIG. 2A shows the positional relationship where the distance X from the multilayer surface 5s to the intersection point C1 of the optical waveguides is 0; FIG. 2B shows the positional relationship where the distance X satisfies $0 \leq X \leq d$ (where "d" represents the thickness of the dielectric multilayer 5); and FIG. 2C shows the positional relationship where the distance X is equal to the thickness "d" of the dielectric multilayer 5.

Figure 3:
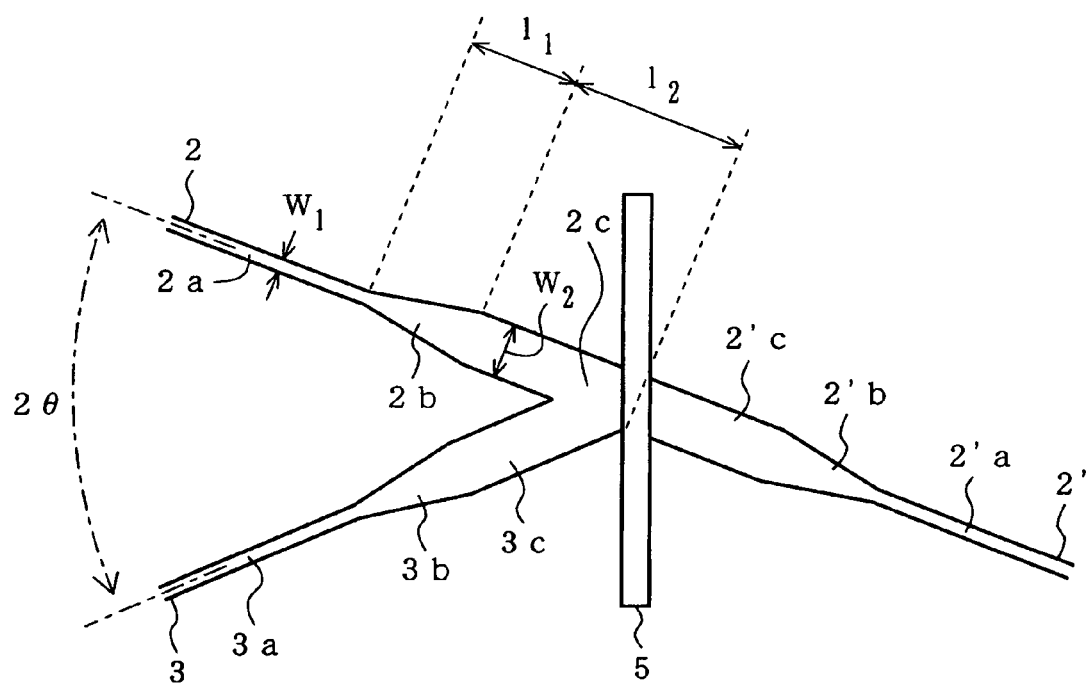
FIG. 3 is an illustration at the vicinity of the dielectric multilayer filter 5 (vicinity of the intersection point C1 of the optical waveguides) in the wavelength multi/demultiplexer 100.

FIG. 3 is an illustration at the vicinity of the dielectric multilayer film 5 (vicinity of the intersection point C1 of the optical waveguides) in the wavelength multi/demultiplexer 100.

At the intersection point C1 where the single-mode optical waveguides 2, 3 and 2' intersect each other, the dielectric multilayer filter 5 is provided.

For the following description, the single-mode optical waveguides 2, 3 and 2' will be referred to as an input optical waveguide 2, an output optical waveguide 3, and an output optical waveguide 2', respectively.

The input optical waveguide 2 is an optical waveguide guiding input light; the output optical waveguide 3 is an optical waveguide guiding reflected light from the dielectric multilayer filter 5; and the output optical waveguide 2' is an optical waveguide guiding transmitted light through the dielectric multilayer filter 5.

For a reason to be described later, smaller divergence angle of the light beam entering the dielectric multilayer filter 5 is better, and therefore the refractive index difference of the optical waveguides is limited to about 0.3% to 0.45% and the width of the optical waveguides is enlarged at the area near the groove 4 to increase the mode field diameter.

That is, the input optical waveguide 2 guiding input light consists of an input optical waveguide 2a, a tapered optical waveguide 2b, and an enlarged optical waveguide 2c. In other words, the optical waveguide width of the input optical waveguide 2a is enlarged through the tapered optical waveguide 2b and connected to the enlarged optical waveguide 2c.

The output optical waveguide 2' consists of an output optical waveguide 2'a, a tapered optical waveguide 2'b, and an enlarged optical waveguide 2'c. Again, the optical waveguide width of the output optical waveguide 2'a is enlarged through the tapered optical waveguide 2'b and connected to the enlarged optical waveguide 2'c.

Then, so as to secure optical coupling with the input optical waveguide 2, the output optical waveguide 2'a, the tapered optical waveguide 2'b and the enlarged optical waveguide 2'c are arranged in the point symmetric position with respect to the input optical waveguide 2a, the tapered optical waveguide 2b and the enlarged optical waveguide 2c, respectively.

The output optical waveguide 3 consists of an output optical waveguide 3a, a tapered optical waveguide 3b, and an enlarged optical waveguide 3c. Again, the optical waveguide width of the output optical waveguide 3a is enlarged through the tapered optical waveguide 3b and connected to the enlarged optical waveguide 3c.

Then, so as to secure optical coupling with the input optical waveguide 2, the output optical waveguide 3a, the tapered optical waveguide 3b and the enlarged optical waveguide 3c are arranged in the mirror symmetric position of the input optical waveguide 2a, the tapered optical waveguide 2b and the enlarged optical waveguide 2c, respectively.

In the above embodiment, the optical waveguides have the refractive index difference of 0.3%, and the width of the optical waveguides 2a, 3a and 2'a at the light input and output terminal portions is 8 μm and enlarged to 25 μm through the tapered optical waveguides 2b, 3b and 2'b. Furthermore, the optical waveguides 2 and 3 intersect each other at an intersection angle of 12 degrees.

In the above embodiment, in order to stabilize the light mode enlarged through the tapered optical waveguide, in the area where the width of the optical waveguides is enlarged at around the intersection portion C1, it is preferable to keep the width of the optical waveguides constant for a certain length. That is, in the area where the width of the optical waveguides is enlarged at around the intersection portion C1, the width of the optical waveguides is preferably a constant up to the position where the optical waveguides contact each other or the outside thereof.

The inventors have conducted their experimental studies about the cause of reflection spectral degradation and found that the wavelength response varies significantly depending on the position of the dielectric multilayer filter 5 disposed relative to the intersection point C1 of the optical waveguides.

Figure 4:
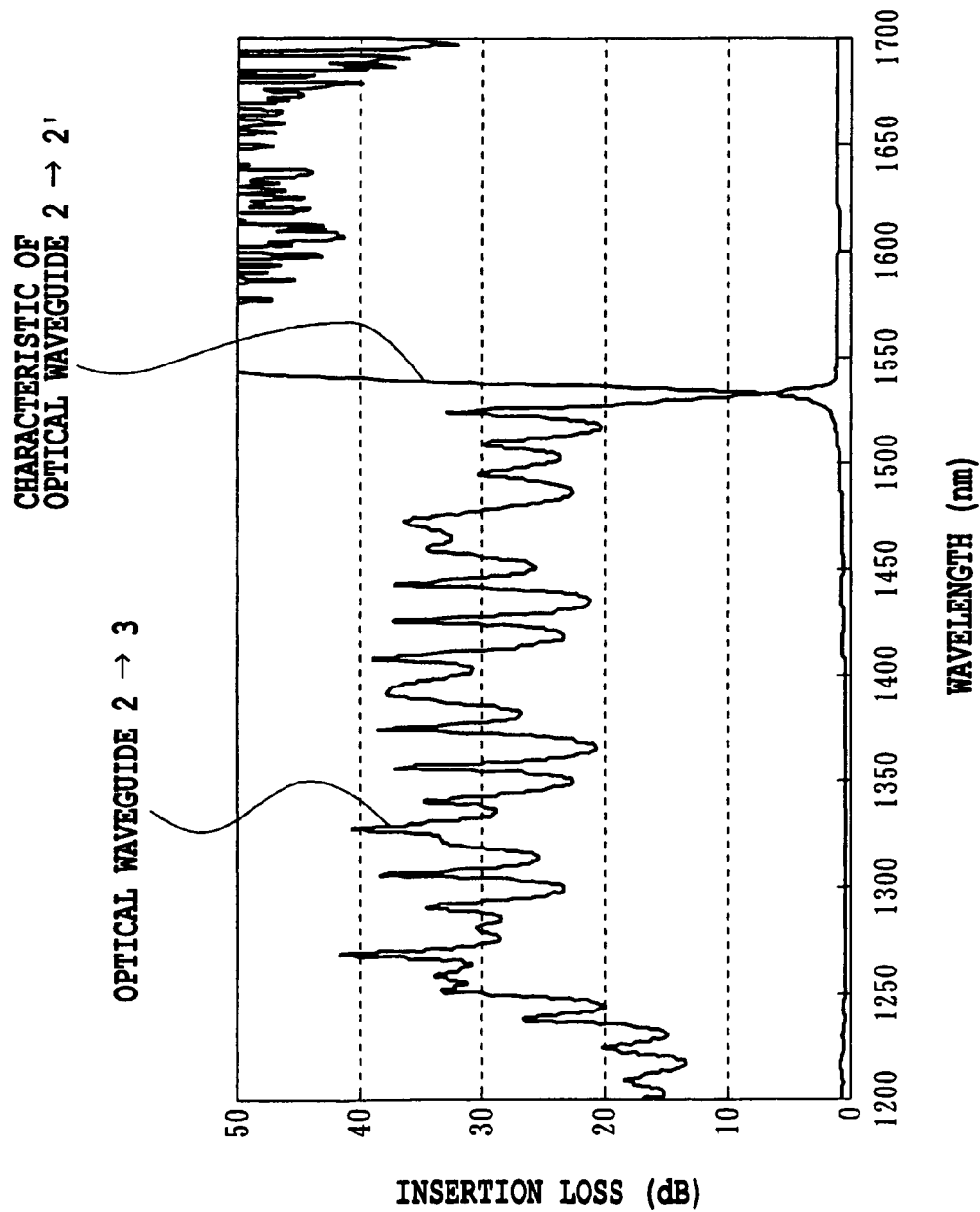
FIG. 4 is a graph showing the demultiplexing characteristic obtained by the first embodiment of the present invention.

FIG. 4 is a graph showing the demultiplexing characteristic obtained in accordance with the first embodiment of the present invention.

For the demultiplexing characteristic obtained by the reflection from the optical waveguide 2 to the optical waveguide 3, a flat and low-loss characteristic is obtained in the longer wavelength than 1550 nm, shows as shown in FIG. 4, and the problem in the prior art, the increased loss in the long wavelength band is solved.

Considering about the case of separating the wavelength bands of 1250-1500 nm and 1550-1600 nm in FIG. 4, at the boundary wavelengths of 1500 nm and 1550 nm, a good loss characteristic of 1.5 dB or less can be seen for both bands.

While, for an isolation to prevent cross talk from the other side, it has a sufficient amount of 50 dB or more in the optical waveguides 2 to 2', it is limited to only about 20 dB in the optical waveguides 2 to 3 due to pass band ripple of the dielectric multilayer filter 5. This is not because of the configuration of the wavelength multi/demultiplexer 100 in the first embodiment, but is generally seen, such as in a configuration of other bulk type wavelength multi/demultiplexer for extracting reflected light from the dielectric multilayer filter 5.

The above characteristic is at sufficient level for practical use even when the wavelength spacing to be separated is further reduced and is 25 nm. For example, in the case of demultiplexing the wavelength bands of 1250-1515 nm and 1540-1600 nm, loss of 2 dB or less and optical isolation of 30 dB (in the optical waveguides 2 to 2') is secured.

Figure 5:
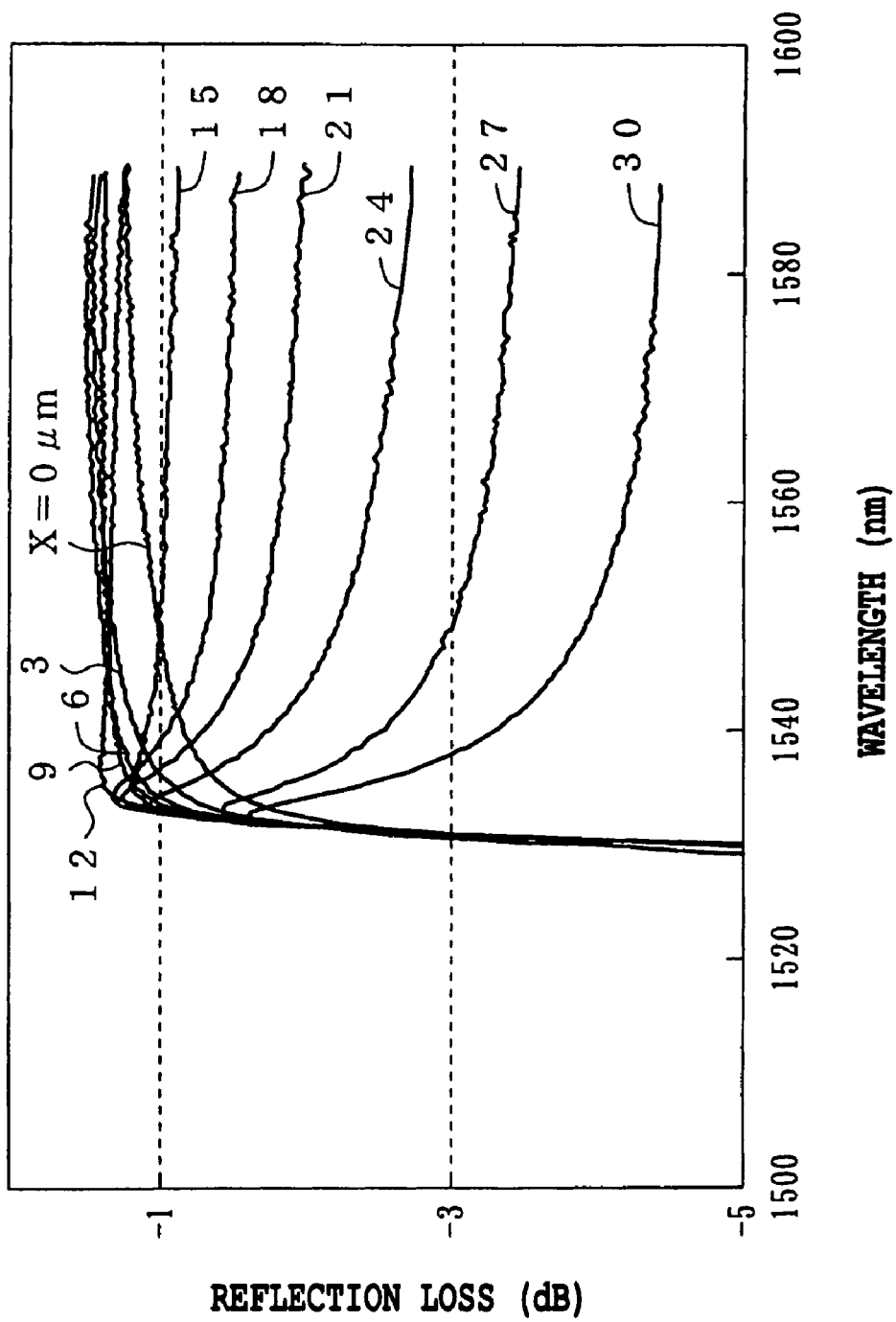
FIG. 5 is a graph showing the relationship between the distance X from the multilayer surface 5s of the dielectric multilayer filter 5 to the intersection point C1, and the reflection spectrum from the optical waveguide 2 to the optical waveguide 3, in the first embodiment of the present invention.

FIG. 5 is a graph, in the above embodiment, showing the relationship between the distance X from the multilayer surface 5s of the dielectric multilayer filter 5 to the intersection point C1 and the reflection spectrum from the optical waveguide 2 to the optical waveguide 3.

The above-mentioned "distance X" is the distance from the multilayer surface 5s on the light-incident side to the point (intersection point C1) where the center axes of the optical waveguides intersect each other, as shown in FIGS. 2A to 2C, which will hereinafter be referred to also as "set distance X."

In the experiment, the set position of the dielectric multilayer film 5 is changed from the position where the intersection point C1 is set at the multilayer film surface 5s (distance "X=0" in FIG. 2A) to the position where the intersection point C1 is set at the boundary of the dielectric multilayer film 5 and the substrate 51 (distance "X=d" in FIG. 2C. The dielectric multilayer filter 5 is a short wavelength pass filter having an alternating multilayer of $SiO_2$ and $Ta_2O_5$ with a thickness of 30 μm stacked on a polyimide thin-film substrate (substrate 51) with a thickness of 5 μm, and its edge wavelength of the stop (reflection) band is set around 1530 nm.

Also, as for the optical waveguides, the relative index difference is 0.3%, with a common width $W_1$ of 8 μm, an enlarged width $W_2$ of 20 μm, and an intersection angle $2\theta$ of 12 degrees.

As for the example shown in FIG. 5, in the range of the distance X from 0 μm to 12 μm, the wavelength response at the edge of the reflection band is improved as the distance X increases and becomes sharper and closer to a rectangular shape. However, if the set distance X is further increased and become 15 μm to 30 μm, a peak of the minimum loss around the edge of the reflection band start to appears. Also, on the longer-wavelength side, the loss tends to increase, and this becomes prominent as the set distance X increases.

Figure 15:
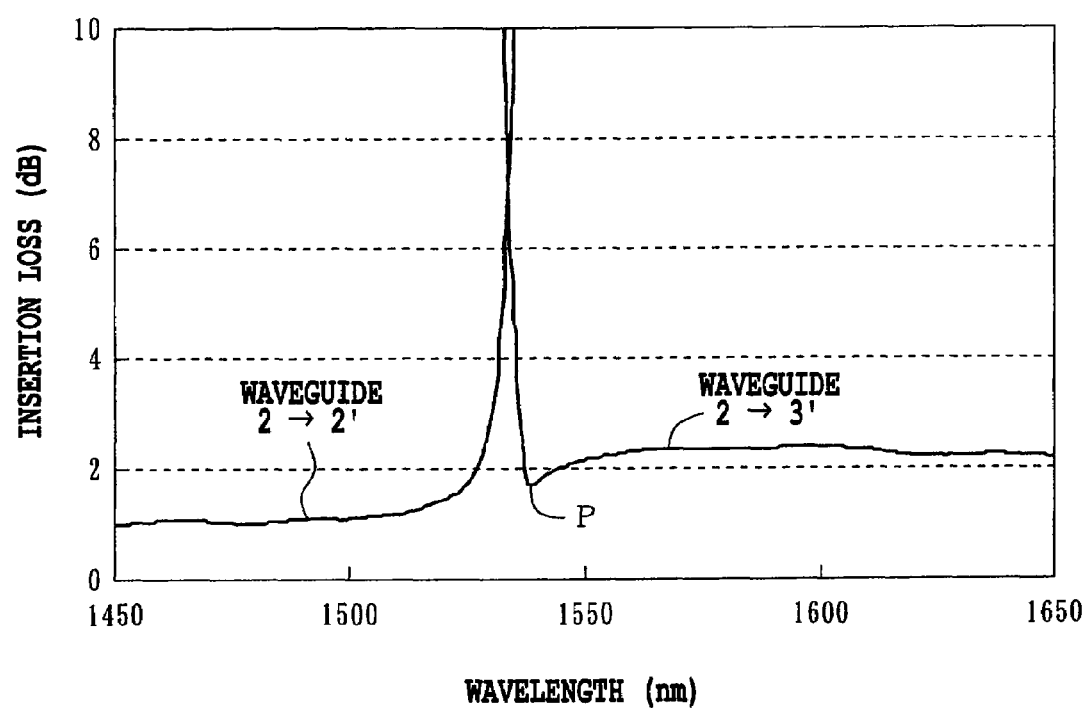
FIG. 15 is a graph showing a characteristic of the conventional wavelength multi/demultiplexer 500.

The increase in loss on the longer-wavelength side is relatively steep, and it is considered that in this range the coupling of the light reflected at the dielectric multilayer filter 5 into the optical waveguide 3 decreases rapidly. It maybe considered that the characteristic (peak P) found in the prior examination as shown in FIG. 15 may correspond to this range. One of the reasons for such characteristic is that, though not apparent, much of the reflection from the dielectric multilayer filter 5 may be determined with reflected waves from around the multilayer surface 5s, while the wavelength response at around the edge wavelength may be determined with reflected waves from the whole multilayer portion.

It is therefore considered that such a phenomenon appears to be outstanding in a thick multilayer with an increased number of layers to achieve a sharp slope characteristic, and will be the same for not only a short wavelength pass edge filter used in the present embodiment, but also a long wavelength pass edge filter and a band-pass filter.

Figure 6:
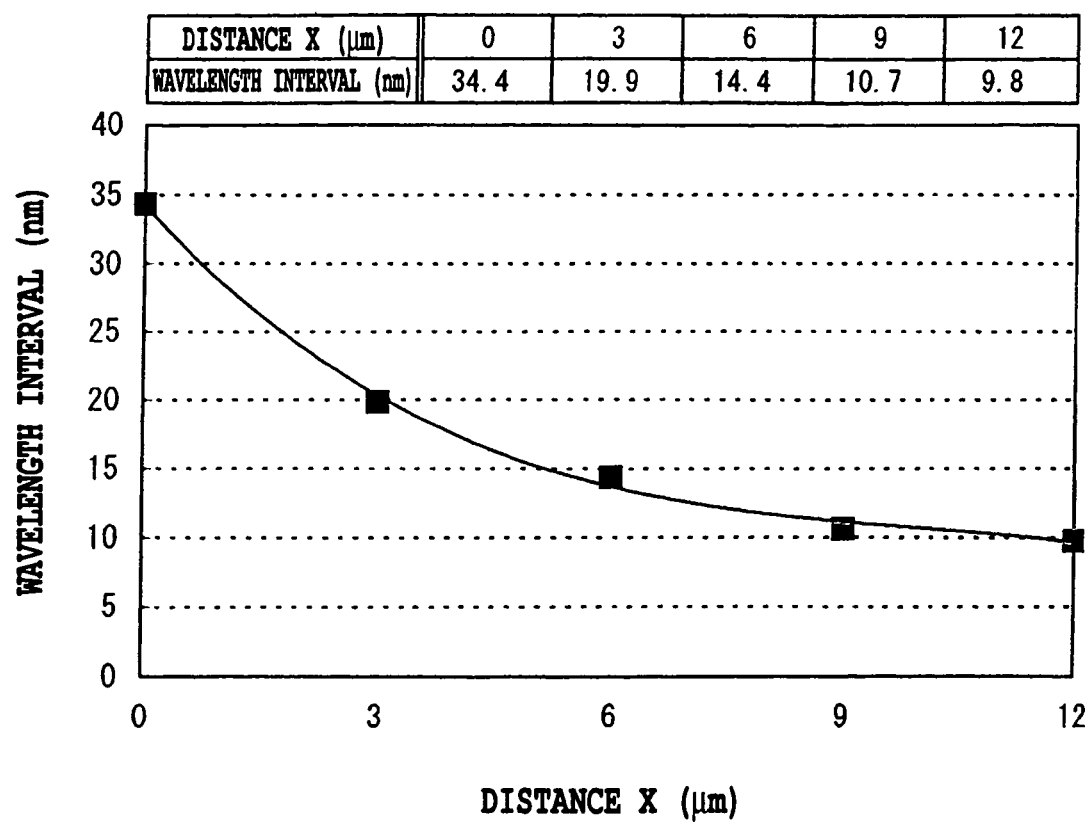
FIG. 6 is a graph showing the relationship between the distance X and the interval of two wavelengths at which the reflection loss from the optical waveguide 2 to the optical waveguide 3 is 0.7 dB and 20 dB respectively, in the first embodiment of the present invention.

FIG. 6 is a graph showing interval of two wavelengths at which the reflection loss is 0.7 dB and 20 dB, in the reflection spectrum shown in FIG. 5, and indicates that the smaller wavelength interval means the better spectral sharpness.

Here, it can be found that the wavelength interval becomes smaller and the characteristic becomes sharper and closer to a rectangular shape as the distance X increases in the range of distances X from 0 μm to 12 μm while there exists a slight peak at X=12 μm.

Also, assuming to separate two wavelength bands with narrow wavelength spacing, it is preferable that the set distance X is 3 μm or more.

It should be noted that, for the set distance X from 15 to 30 μm, the loss increases from a peak of the minimum loss around the edge wavelength along towards to the longer-wavelength side and the reflection loss exceeding more than 1 dB is seen (FIG. 5). Therefore, for this range, distance X is not shown in FIG. 6.

Figure 7:
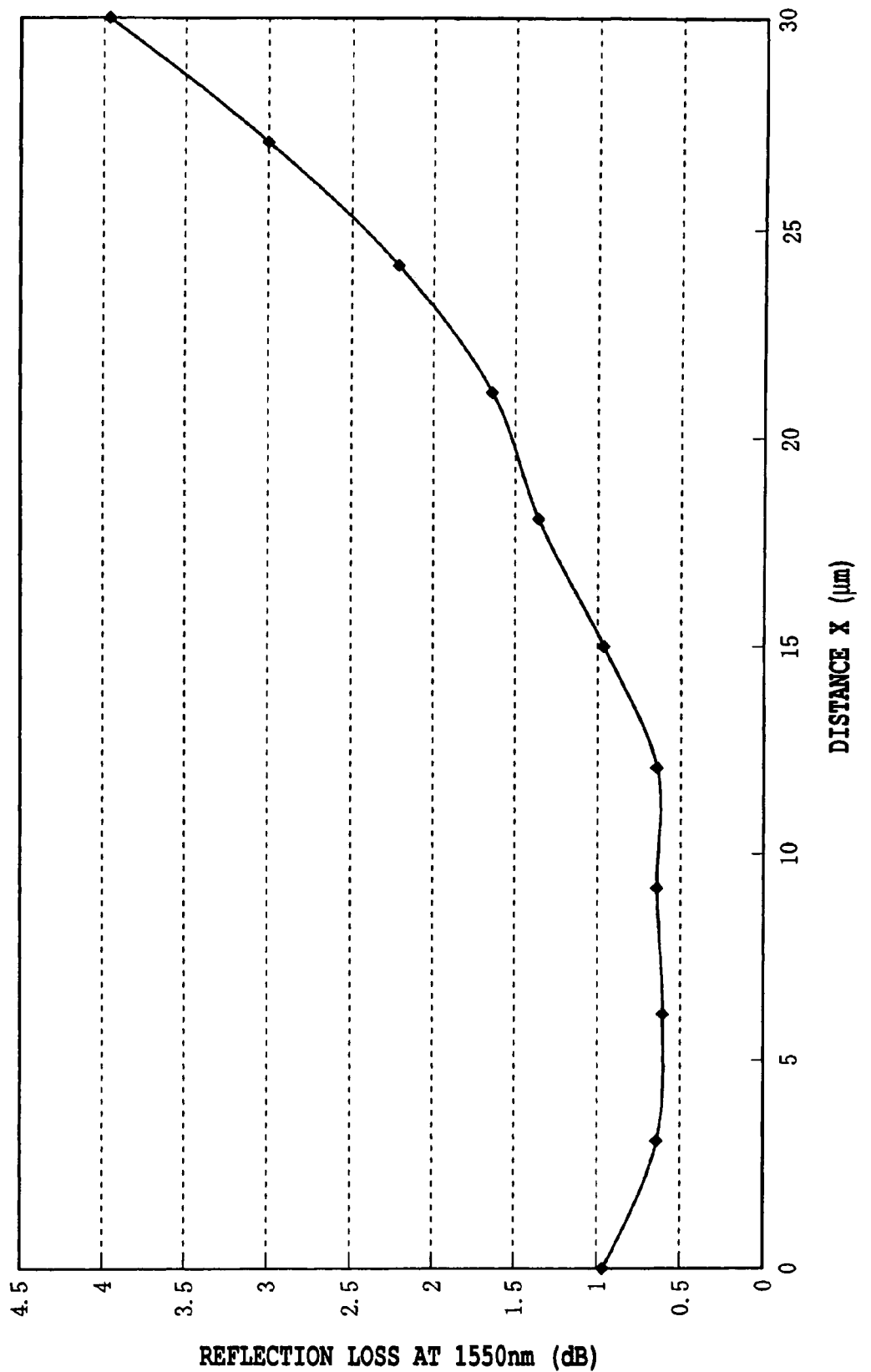
FIG. 7 is a graph showing the relationship between the distance X and the reflection loss at the edge wavelength of the reflection band, in the first embodiment of the present invention.

FIG. 7 is a graph showing the relationship between the distance X and the reflection loss at the edge wavelength in the reflection band.

The horizontal axis represents the distance X from the dielectric multilayer surface to the intersection point of the optical waveguides, while the vertical axis represents the reflection loss at the wavelength of 1550 nm. In the range of the distance X from 0 µm to 15 µm, the reflection loss does not increase excessively and is 1 dB or less. Furthermore, in the range of the distance X from 3 µm to 12 µm, the reflection loss is at its minimum.

According to the experimental results, if the distance X is set at the range of 0 µm to 15 µm, which corresponds to ½ of the thickness of the dielectric multilayer, the reflection loss does not excessively increase in the reflection band and is within 1 dB. Furthermore, if the distance X is set at the range between 3 µm and 12 µm, which corresponds to ⅒ and ⅖ of the thickness of the dielectric multilayer, respectively, the wavelength response becomes closer to a rectangular shape and the separation is improved for narrowly disposed wavelengths.

That is, the range of the distance X from 3 µm to 12 µm is best suited for achieving both good wavelength response and low reflection loss in the reflection band. This nature is seen almost similarly in other cases with different parameters of the intersectional optical waveguide.

In the above embodiment, a primary feature is to control the distance X from the dielectric multilayer 5 to the intersection point C1 of the optical waveguides within a predetermined range in order to prevent reflection spectral degradation which is a problem in the prior art embodiment.

FIG. 8 is a summary for the suitable ranges of the distance X when the width $W_2$ of the optical waveguides in the intersection portion is 8 µm and 20 µm, and the intersection angle 2θ is 8, 10 and 12 degrees.

Here, the condition of 20 µm and 12 degrees corresponds to the case in FIG. 5. It should be noted that the width of the optical waveguides of $W_2$=8 µm means that the optical waveguides are not enlarged at the intersection point C1, having a width of 8 µm for the entire length, while the width of the optical waveguides of 20 µm means that the common width of the optical waveguides of 8 µm is enlarged to 20 µm at the intersection point C1.

In FIG. 8, the circular mark indicates that the condition is best suited for achieving both good wavelength response and low reflection loss in the reflection band; the triangular mark indicates that the condition is acceptable for reflection loss; and the cross mark indicates that the set distance X is ill-suited. Regardless of the optical waveguide width and the intersection angle, the similar results can be obtained as in FIG. 5.

FIG. 9 is a summary for the case where the refractive index difference of the optical waveguides is set at 0.45% and the dielectric multilayer filter 5 is replaced with an alternating multilayer of $SiO_2$ and $Ta_2O_5$ with a thickness of about 40 µm whose edge wavelength of the stop band is set at around 1620 mm.

The results for the case shown in FIG. 9 are the same as that shown in FIG. 8.

Figure 10:
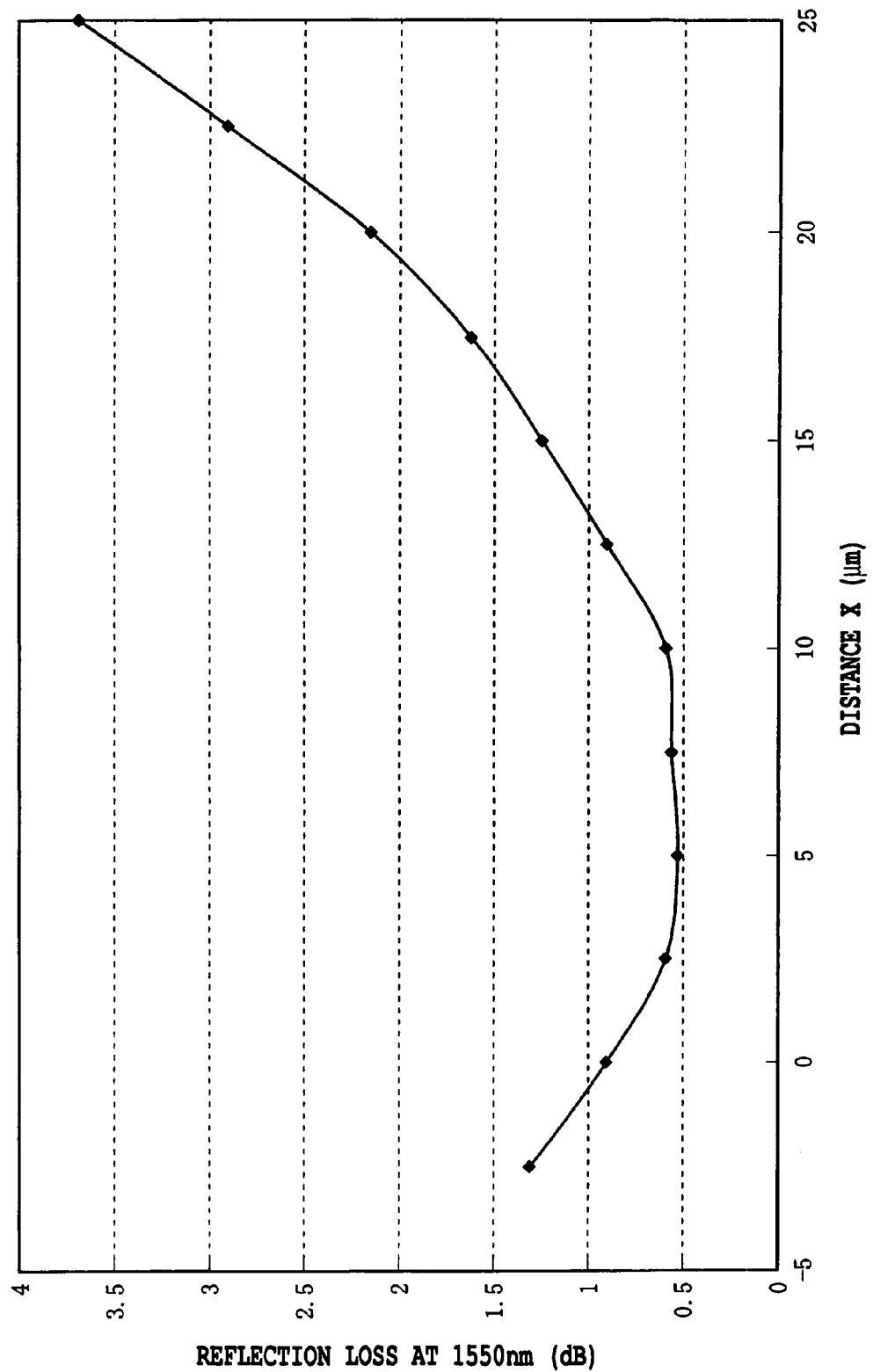
FIG. 10 is a graph showing the relationship between the distance X and the reflection loss at the edge wavelength of the reflection band when the thickness of the dielectric multilayer 5 is reduced to 25 μm, in the first embodiment of the present invention.

FIG. 10 is a graph showing the relationship between the distance X and the reflection loss at the edge wavelength of the reflection band when the thickness of the dielectric multilayer 5 is reduced to 25 µm.

The horizontal axis represents the distance X from the dielectric multilayer surface to the intersection point of the optical waveguides, while the vertical axis represents the reflection loss at the wavelength of 1550 nm. The edge wavelength of the dielectric multilayer filter is set at 1530 nm; the intersection angle 2θ of the optical waveguides is 12 degrees; the refractive index difference is 0.3%; and the common width and enlarged width of the optical waveguides is 8 µm and 25 µm, respectively. In the range of the distance X from 0 µm to 12.5 µm, which corresponds to ½ of the thickness of the dielectric multilayer, the reflection loss shows good characteristic of 1 dB or less. Furthermore, in the range of the distance X between 2.5 µm and 10 µm, which correspond to ⅒ and ⅖ of the thickness of the dielectric multilayer, respectively, a lower loss characteristic can be obtained.

Summarizing the above results, it is required to put the intersection point C1 of the optical waveguides within the area between the surface at light-incident side and the half thickness of the dielectric multilayer 5 (i.e. $0 \leq X \leq d/2$) in order not to increase in the reflection loss.

In addition, to obtain good characteristics in loss and wavelength response simultaneously, it is preferable, within the above area, to further set the distance X within a limited area by about 10% inside of the thickness of the dielectric multilayer. More specifically, to obtain good characteristics in loss and wavelength response simultaneously, it is preferable to satisfy $d/10 \leq X \leq 2d/5$.

In the above embodiment, an example is shown where the distance X from the multilayer surface on the light-incident side of the dielectric multilayer film to the intersection point of the center of the two intersecting optical waveguides is configured to satisfy $0 \leq X \leq d/2$ (where "d" represents the thickness of the dielectric multilayer film).

Next, the effect of parameters of optical waveguides on multi/demultiplexing characteristics will be discussed and then the suitable parameters of the optical waveguides will be described.

In the wavelength multi/demultiplexer 100 having the dielectric multilayer filter 5 provided between the optical waveguides, light input from the optical waveguides to the area of the groove 4 and entered the dielectric multilayer filter 5 turns out to be divergent light. This will degrade the characteristics from that of the dielectric multilayer filter 5 which is designed to be used with collimated light incidence.

In the case of divergent light, the incident angle to the dielectric multilayer filter 5 spreads by the divergent angle around the intersection angle of the optical waveguides, and light enters the dielectric multilayer filter 5 at different angles. As such, because entering the dielectric multilayer filter 5 at different angles will cause the above degradation in wavelength response. This is because the different incident angles cause a slight shift in the wavelength response, and the total transmission spectrum appeared as convolution in wavelength response of the dielectric multilayer filter 5 becomes dull compared with that with collimated light incidence.

To reduce this effect, it is effective to use optical waveguides with a low refractive index difference and to increase the width of optical waveguides contacting to the groove 4. Thus, using optical waveguides with a low refractive index difference and enlarging the width of optical waveguides contacting to the groove 4 enlarges the mode field diameter of the optical waveguides contacting to the groove 4 and this results in the reduction of the divergence angle of the light entering the dielectric multilayer filter 5.

If setting the refractive index difference at less than 0.3%, it will fail to match with the refractive index difference of a standard fiber and tolerable bending radius of the optical waveguides will become larger, increasing the size of the optical waveguides. Therefore, it is not practical to set the relative refractive index difference at less than 0.3%. On the other hand, if setting the refractive index difference at 0.45% or more, it will degrade the wavelength response of the dielectric multilayer filter 5, and the desired separation of wavelengths can not be obtained.

Accordingly, it is preferable to set the refractive index difference at about 0.3% to 0.45%.

Also, if the refractive index difference is 0.3% to 0.45%, it is preferable that the width $W_2$ Of the enlarged optical waveguide is 18 µm or more relative to the common width $W_1$ of the input/output optical waveguide 2*a* of 7 µm to 8 µm. This is because if the width $W_2$ of the input/output optical waveguide is less than 18 µm, the obtained effect in enlarging the mode field diameter is small.

Furthermore, while the core thickness of the optical waveguides is set at 7 µm to 10 µm and the cross-section of the input/output optical waveguide 2*a* is almost rectangular shape, bending loss of the optical waveguides can be reduced by setting the core thickness relatively thicker. In this manner, it is advantageous to reduce the curvature of bent portions to reduce the size of the optical waveguides.

It is preferable to design the length $l_1$ of the tapered optical waveguide 2*b* to have the tapered angle of 1 degree or less for one side, which provides a gentle taper enlarging the mode field diameter gradually so that an excess loss can be prevented. Preferably, the enlarged optical waveguide 2*c* is extended with a constant width for a certain length, and the length $l_2$ of the enlarged optical waveguide 2*c* is designed to extend longer from the position contacting with the other intersecting waveguide. By securing a certain length for the length $l_2$ of the enlarged optical waveguide 2*c*, propagating mode in the enlarged optical waveguide 2*c* can be stabilized. Thus, the center of the light input into the dielectric multilayer filter 5 is aligned with the center of the optical waveguide, maintaining the reflection characteristic stabilized as well.

The wavelength response at around the edge wavelength of the pass band also depends on the intersection angle 2θ between the optical waveguides shown in FIG. 3. Since the slope of the wavelength response of the dielectric multilayer filter 5 is proportional to cos θ, the larger the incident angle θ to the dielectric multilayer filter 5 is, more salient the wavelength response degrades around the edge wavelength due to the light divergence. Therefore, the wavelength response around the edge wavelength depends on the intersection angle 2θ between the optical waveguides.

Accordingly, it is preferable to reduce the intersection angle 2θ to avoid degradation of the wavelength response around the edge wavelength. Although reduction in the intersection angle 2θ degrades the return loss characteristic at the dielectric multilayer filter 5, this degradation can be alleviated by adopting the enlarged optical waveguide configuration.

Figure 11:
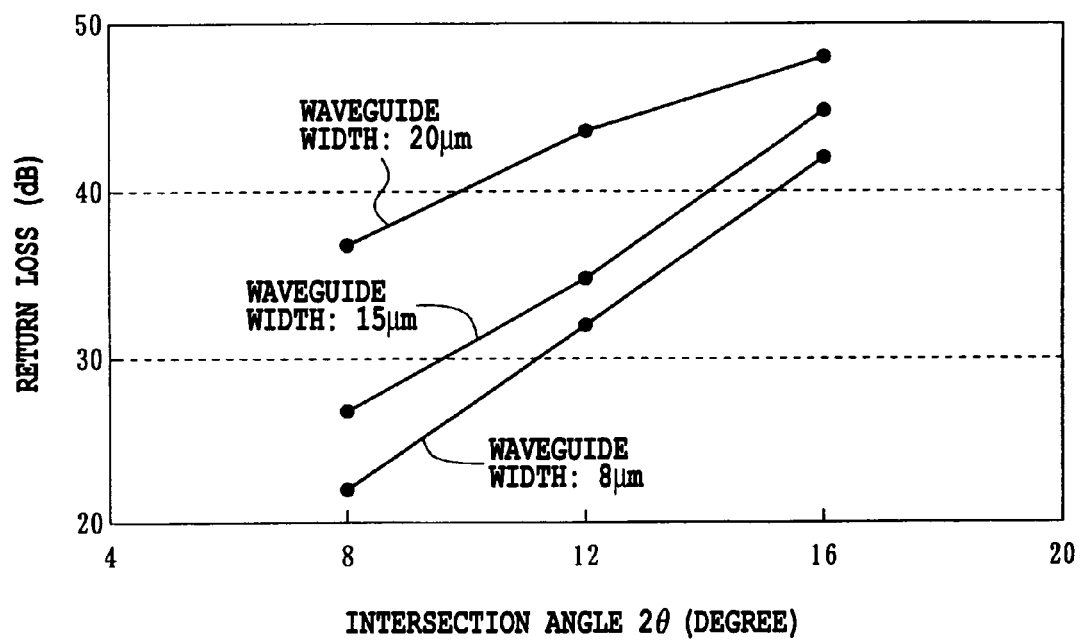
FIG. 11 is a graph showing the return loss with respect to the intersection angle 2θ between the optical waveguides, as a parameter of enlarged width $W_2$ of the optical waveguides, in the first embodiment of the present invention.

FIG. 11 is a graph showing, in the above embodiment, the return loss with respect to the intersection angle 2θ between the optical waveguides, as a parameter of the enlarged width $W_2$ of the optical waveguides.

The optical waveguides used here have a refractive index difference of about 0.3%.

From FIG. 11, although reducing the intersection angle 2θ between the optical waveguides degrades the return loss characteristic, larger width $W_2$ of the optical waveguides leads to larger return loss even with the same intersection angle 2θ between the optical waveguides. And by setting the intersection angle between the optical waveguides at 8 to 12 degrees and the width $W_2$ Of the optical waveguides at 20 µm or more, generally good return loss characteristic of more than 35 dB can be obtained. This nature is seen for optical waveguides with a relative refractive index difference of about 0.45%, and by adjusting the width $W_2$ of the optical waveguides the intersection angle between the optical waveguides can be set in the range of 8 to 12 degrees.

Figure 12:
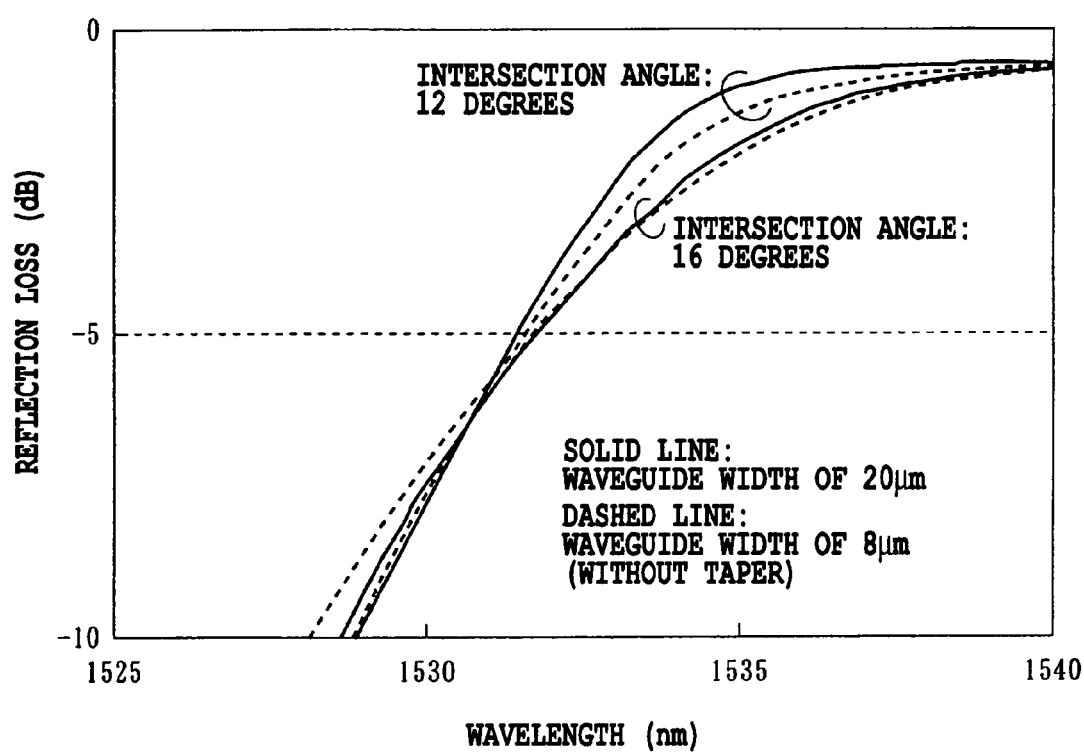
FIG. 12 is a graph comparing the reflection spectrum between cases with (solid line) and without (dashed line) the optical waveguide tapered structure, as a parameter of intersection angle, in the first embodiment of the present invention.

FIG. 12 is a graph comparing, in the above embodiment, the reflection spectrum at around the edge wavelength with (solid line) and without (dashed line) the optical waveguide enlarged structure, as a parameter of the intersection angle.

FIG. 12 shows the effect on the wavelength response at around the edge wavelength by introducing the above enlarged optical waveguides and setting the intersection angle. It can be seen that the slope of the wavelength response at around the edge wavelength is improved in the case of an intersection angle of 12 degrees compared to 16 degrees. It can be also confirmed that the wavelength response can be sharper by enlarging the width of the optical waveguides to 20 µm, while the intersection angle is constant at 12 or 16 degrees. Such improvement on the wavelength response at around the edge wavelength can be also obtained in the pass characteristic from the optical waveguide 2 to the optical waveguide 2'.

The above embodiment is concerning with a wavelength multi/demultiplexer for separating two wavelength bands in which edges of the one wavelength band and of the other wavelength band are disposed with spacing of about 50 nm or less. A dielectric multilayer filter is provided in an intersection part where two optical waveguides intersect each other and incident light to the dielectric multilayer filter is separated into transmitted light and reflected light. Here, the distance X from the multilayer surface on the light-incident side of the dielectric multilayer to the central intersection point of the two intersecting optical waveguides is arranged to satisfy $0 \leq X \leq d/2$ (where "d" represents the thickness of the dielectric multilayer film).

Furthermore, the above arrangement of the distance X is effective particularly when the thickness of the dielectric multilayer film 5 is 20 µm or more.

Second Embodiment

Figure 13:
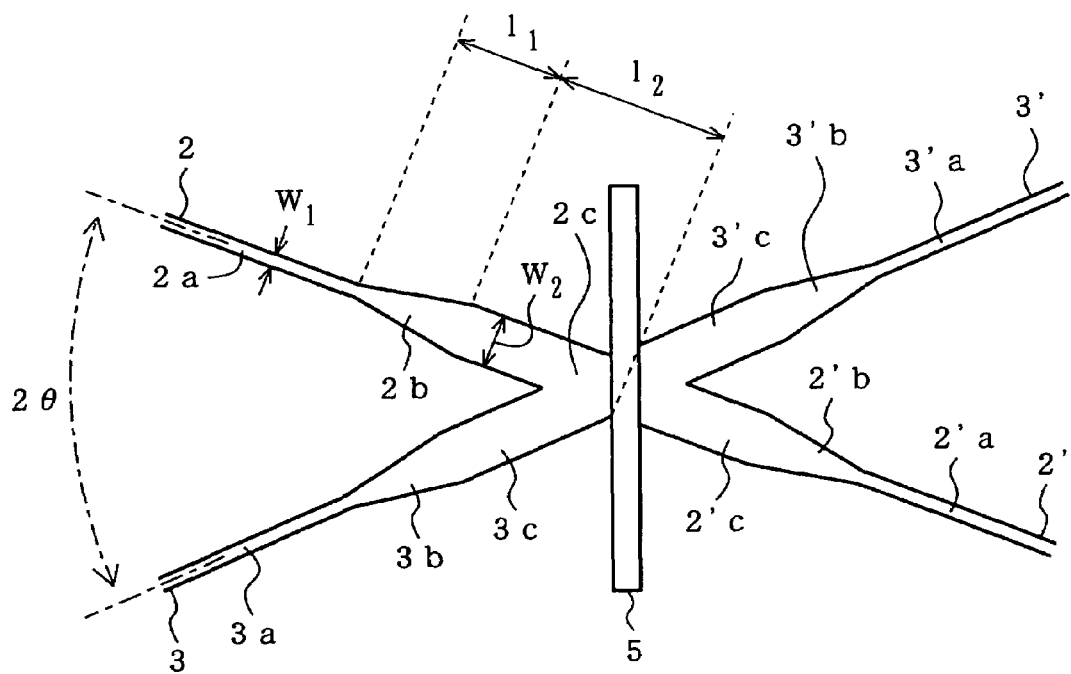
FIG. 13 is an illustration of a wavelength multi/demultiplexer 200 according to a second embodiment of the present invention, which shows the vicinity of a dielectric multilayer film 5 (vicinity of an intersection point C1 of optical waveguides)
Figure 14:
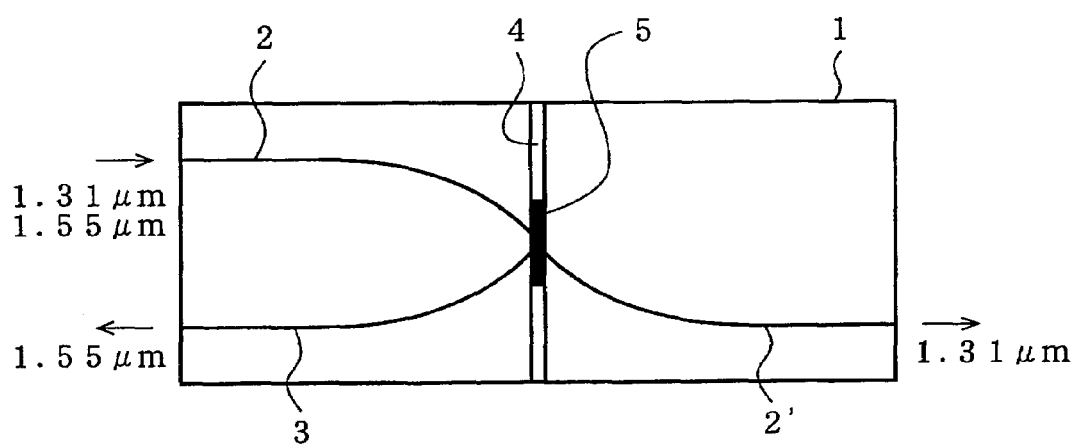
FIG. 14 is an illustration of a conventional wavelength multi/demultiplexer 500.

FIG. 13 is an illustration of a wavelength multi/demultiplexer 200 according to the second embodiment of the present invention, and shows the vicinity of a dielectric multilayer filter 5 (vicinity of an intersection point C1 of optical waveguides).

The configuration of the wavelength multi/demultiplexer 200 is basically the same as that of the wavelength multi/demultiplexer 100, except that an optical waveguide 3' is provided in the point symmetric position to the output optical waveguide 3.

The output optical waveguide 3' consists of an output optical waveguide 3'*a*, a tapered optical waveguide 3'*b*, and an enlarged optical waveguide 3'*c*. That is, the width of the output optical waveguide 3'*a* is enlarged through the tapered optical waveguide 3'*b* and connected to the enlarged optical waveguide 3'*c*.

In addition, the optical waveguide 3' may be used as a monitoring terminal, etc., or it may be used as an open terminal.

The invention claimed is:

1. A wavelength multi/demultiplexer comprising a dielectric multilayer filter at an intersection portion where two optical waveguides intersect each other and separating incident light to the dielectric multilayer filter to transmitted light and reflected light, wherein the thickness d of the dielectric multilayer is 20 µm or more and the distance X from the multilayer surface on the light-incident side of the dielectric multilayer to the central intersection point of the two intersecting optical waveguides satisfies $d/10 \leqq X \leqq 2d/5$.

2. The wavelength multi/demultiplexer according to claim 1, wherein the width of the two intersecting optical waveguides is enlarged to 18 μm or more toward the intersection portion.

3. The wavelength multi/demultiplexer according to claim 2, wherein the enlarged width of the optical waveguides is constant in the vicinity of the intersection portion.

4. The wavelength multi/demultiplexer according to claim 1, wherein the refractive index difference of the optical waveguides is set at 0.3% to 0.45%.

5. The wavelength multi/demultiplexer according to claim 1, wherein the intersection angle between said two intersecting optical waveguides is 8 to 16 degrees.

6. The wavelength multi/demultiplexer according to claim 2, wherein the refractive index difference of the optical waveguides is set at 0.3% to 0.45%.

7. The wavelength multi/demultiplexer according to claim 3, wherein the refractive index difference of the optical waveguides is set at 0.3% to 0.45%.

8. The wavelength multi/demultiplexer according to claim 2, wherein the intersection angle between said two intersecting optical waveguides is 8 to 16 degrees.

9. The wavelength multi/demultiplexer according to claim 3, wherein the intersection angle between said two intersecting optical waveguides is 8 to 16 degrees.

* * * * *